US 9,330,660 B2

(12) United States Patent
Arai et al.

(10) Patent No.: US 9,330,660 B2
(45) Date of Patent: *May 3, 2016

(54) GRAMMAR FRAGMENT ACQUISITION USING SYNTACTIC AND SEMANTIC CLUSTERING

(71) Applicant: AT&T Intellectual Property II, L.P., Atlanta, GA (US)

(72) Inventors: Kazuhiro Arai, Tokyo (JP); Allen L. Gorin, Berkeley Heights, NJ (US); Giuseppe Riccardi, Hoboken, NJ (US); Jeremy H. Wright, Warren, NJ (US)

(73) Assignees: AT&T Intellectual Property II, L.P., Atlanta, GA (US); Nippon Telegraph & Telephone, Yokosuka, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,536

(22) Filed: Mar. 4, 2014

(65) Prior Publication Data
US 2014/0303978 A1  Oct. 9, 2014

Related U.S. Application Data

(63) Continuation of application No. 09/666,563, filed on Sep. 21, 2000, now Pat. No. 8,666,744, which is a continuation of application No. 09/217,635, filed on Dec. 21, 1998, now Pat. No. 6,173,261, said (Continued)

(51) Int. Cl.
*G10L 15/00* (2013.01)
*G10L 15/06* (2013.01)
*G06F 17/27* (2006.01)
*G10L 15/193* (2013.01)

(52) U.S. Cl.
CPC .......... *G10L 15/063* (2013.01); *G06F 17/274* (2013.01); *G10L 15/193* (2013.01); *G10L 2015/0631* (2013.01)

(58) Field of Classification Search
CPC . G06F 17/274; G06F 17/2735; G06F 17/276; G06F 17/28; G06F 17/30705; G10L 15/063; G10L 15/193; G10L 2015/0631
See application file for complete search history.

(56) References Cited

U.S. PATENT DOCUMENTS 4,477,600 A   10/1984  Fesman
4,866,778 A    9/1989  Baker
4,903,305 A    2/1990  Gillick et al.
5,029,214 A    7/1991  Hollander (Continued)

OTHER PUBLICATIONS

Emami et al., "Using A Connectionist Model IN a Syntactical Based Language Model", IEEE International Conference on Acoustics, Speech, and Signal Processing, 2003, Proceedings, Apr. 2003.

(Continued)

*Primary Examiner* — Angela A Armstrong

(57) ABSTRACT

A method and apparatus are provided for automatically acquiring grammar fragments for recognizing and understanding fluently spoken language. Grammar fragments representing a set of syntactically and semantically similar phrases may be generated using three probability distributions: of succeeding words, of preceding words, and of associated call-types. The similarity between phrases may be measured by applying Kullback-Leibler distance to these tree probability distributions. Phrases being close in all three distances may be clustered into a grammar fragment.

20 Claims, 11 Drawing Sheets

Related U.S. Application Data application No. 09/666,563 is a continuation-in-part of application No. 08/943,944, filed on Oct. 3, 1997, now Pat. No. 6,192,110, and a continuation-in-part of application No. 08/528,578, filed on Sep. 15, 1995, now Pat. No. 5,675,707.

(60) Provisional application No. 60/102,433, filed on Sep. 30, 1998.

(56) References Cited

U.S. PATENT DOCUMENTS

| | | |
|---|---|---|
| 5,033,088 A | 7/1991 | Shipman |
| 5,099,425 A | 3/1992 | Kanno: Yuji et al. |
| 5,384,892 A | 1/1995 | Strong |
| 5,390,272 A | 2/1995 | Repta et al. |
| 5,434,906 A | 7/1995 | Robinson et al. |
| 5,457,768 A | 10/1995 | Tsuboi et al. |
| 5,666,400 A | 9/1997 | McAllister et al. |
| 5,675,707 A | 10/1997 | Gorin et al. |
| 5,719,921 A | 2/1998 | Vysotsky et al. |
| 5,748,841 A | 5/1998 | Morin et al. |
| 5,794,193 A | 8/1998 | Gorin |
| 5,839,106 A | 11/1998 | Bellegarda |
| 5,860,063 A | 1/1999 | Gorin et al. |
| 5,905,774 A | 5/1999 | Tatchell et al. |
| 5,960,384 A | 9/1999 | Brash |
| 6,021,384 A | 2/2000 | Gorin et al. |
| 6,023,673 A | 2/2000 | Bakis et al. |
| 6,044,337 A | 3/2000 | Gorin et al. |
| 6,067,520 A | 5/2000 | Lee |
| 6,163,769 A | 12/2000 | Acero et al. |
| 6,173,261 B1 | 1/2001 | Arai et al. |
| 6,182,039 B1 | 1/2001 | Rigazio et al. |
| 6,192,110 B1 | 2/2001 | Abella et al. |
| 6,278,967 B1 | 8/2001 | Akers et al. |
| 8,666,744 B1 * | 3/2014 | Arai et al. .......... 704/257 |

OTHER PUBLICATIONS

IBM TDB'051, Technical Disclosure Bulletin NN85102051, Pseudo-Pos Language Model Having A Redefined Vocabulary, Oct. 1985.

Patent Application for U.S. Appl. No. 08/943,944, "Method and Apparatus for Generating Semantically Consistent Inputs to a Dialog Manager", filed Oct. 3, 1997, by Alicia Abella et al.

Langkilde et al., "Automatic Prediction of Problematic Human-Computer Dialogues in 'How May I Help You?'," *Proceedings of the IEEE Workshop on Automatic Speech Recognition and Understanding*, Keystone, CO, pp. 369-372, 1999.

\* cited by examiner

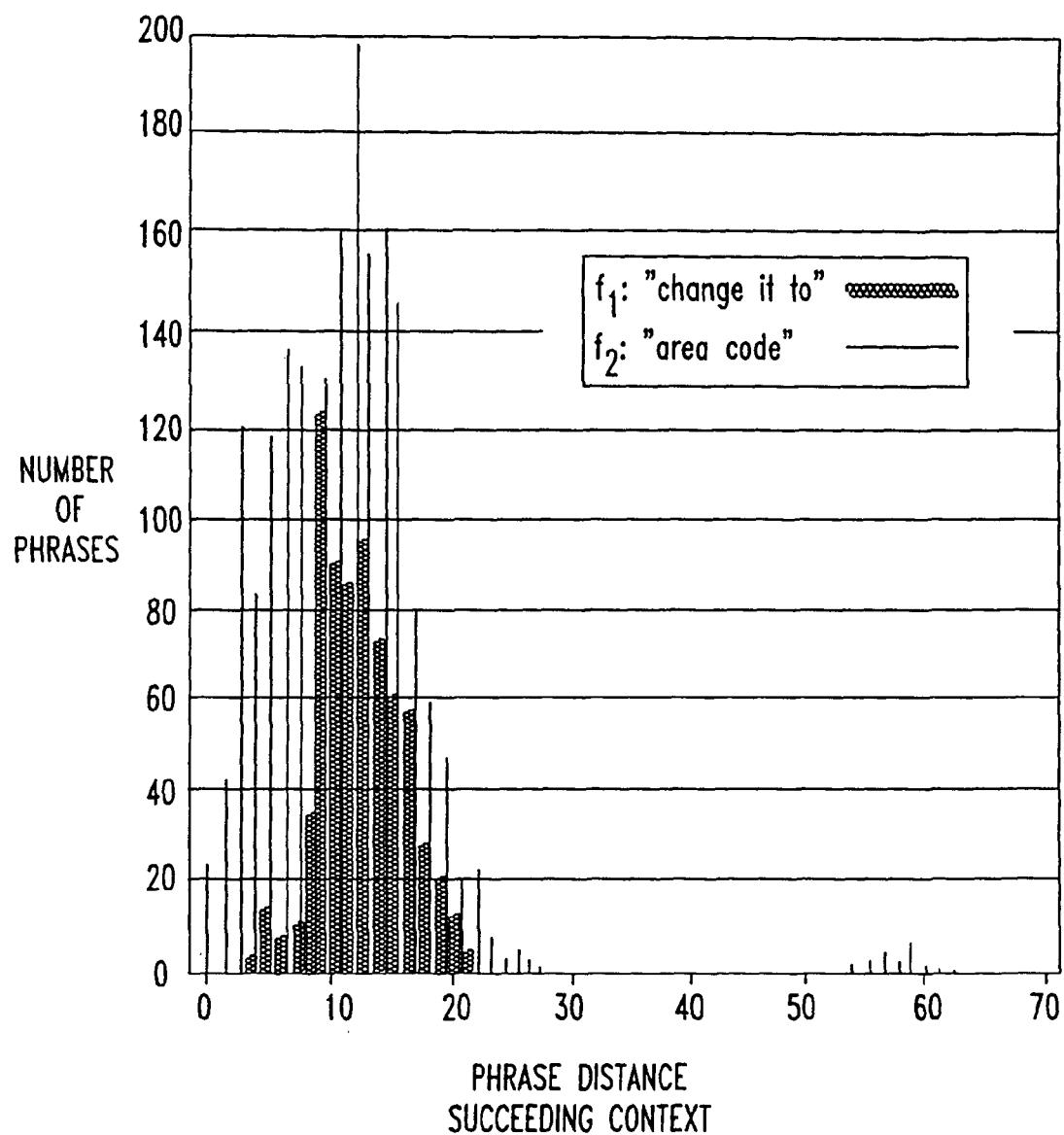

FIG. 4

| RANK | PRECEDING CONTEXT | | SUCCEEDING CONTEXT | | CALL-TYPE | |
|---|---|---|---|---|---|---|
| | PHRASE | $Dp(f^0 f_i)$ | PHRASE | $Dp(f^0 f_i)$ | PHRASE | $Dp(f^0 f_i)$ |
| 1 | charge it | 0.1 | charge this to | 0.53 | charge it | 0.01 |
| 2 | bill it to | 0.47 | it charged to | 0.55 | it to my | 0.02 |
| 3 | bill it | 0.48 | this call on | 0.55 | and charge it | 0.03 |
| 4 | put it on | 0.67 | trying to use | 0.55 | and bill it | 0.04 |
| 5 | have it | 0.84 | put this on | 0.59 | bill it to | 0.08 |
| 6 | put it | 1.03 | this on | 0.63 | it to | 0.09 |
| 7 | charge | 1.35 | put it on | 0.66 | call and bill | 0.09 |
| 8 | I keep getting | 1.44 | call using | 0.67 | and have | 0.10 |
| 9 | then I | 1.64 | charge to | 0.68 | bill it | 0.10 |
| 10 | T calling card | 1.81 | bill it to | 0.71 | charged to my | 0.10 |
| ⋮ | ⋮ | ⋮ | ⋮ | ⋮ | ⋮ | ⋮ |
| 17 | I can't seem | 2.42 | like to use | 0.88 | to my | 0.17 |
| 18 | they said | 2.52 Np | using | 0.88 | *charge to* | 0.18 |
| 19 | *charge to* | 3.04 | it on | 0.91 | to bill | 0.21 Nc |
| 20 | he | 3.07 | use | 0.94 | like to bill | 0.27 |
| 21 | I didn't | 3.23 | billed to | 1.10 | have it | 0.29 |
| 22 | reverse | 3.26 | it billed to | 1.16 | it charged to | 0.29 |
| 23 | I can't get | 3.29 | call with | 1.38 | billed to my | 0.30 |
| 24 | for some reason | 3.30 | bill this to | 1.91 | a call and | 0.31 |
| 25 | see if | 3.31 | *charge to* | 2.35 | it charged | 0.31 |
| 26 | every time | 3.36 | on | 2.79 Ns | billed to | 0.32 |
| 27 | I got | 3.48 | give you | 4.02 | phone call and | 0.34 |
| 28 | I can't | 3.55 | number to | 4.69 | to charge | 0.37 |

N("charge it to")

FIG. 5

| | | | | |
|---|---|---|---|---|
| <000> | "hi operator"<br>"yes ma'am"<br>"yes" | "yes good morning"<br>"yes operator" | "yeah hi"<br>"hi" | "yes please"<br>"yeah" |
| <001> | "a" | "a a" | | |
| <002> | "make" | "place" | | |
| <003> | "operator I'D like"<br>"I'd like" | "I want" | "I would like" | "I like" |
| <004> | "make this" | "place a" | "make a" | |
| <005> | "have" | "need" | "want" | "would like" |
| <012> | "calling card" | "credit card" | | |
| <013> | "collect phone call" | "collect call please" | "collect call" | |
| <015> | "want to make" | "like to place" | "like to make" | |
| <028> | "home phone number" | "home number" | "home phone" | |
| <038> | "charge it to" | "bill it to" | "charge to" | |

FIG. 6A

| Several Grammar Fragments | | | | |
|---|---|---|---|---|
| <002> | "make" | "place" | | |
| <005> | "have" | "need" | "want" | "would like" |
| <015> | "want to make" | "like to place" | "like to make" | |

FIG. 6B

| Grammar Fragments created from other Fragments | | | | |
|---|---|---|---|---|
| <015> | "<005> to <002>"    "like to <002>" | | | |
| | word sequences matching this grammar fragment | | | |
| | "want to place"<br>"want to make"<br>"like to place" | "would like to place"<br>"would like to make"<br>"like to make" | "need to place"<br>"need to make" | "have to place"<br>"have to make" |

GRAMMAR FRAGMENT ACQUISITION USING SYNTACTIC AND SEMANTIC CLUSTERING

PRIORITY INFORMATION

This application is a continuation of U.S. patent application Ser. No. 09/666,563, filed on Sep. 21, 2000, which is a continuation of U.S. patent application Ser. No. 09/217,635, filed Dec. 21, 1998, now U.S. Pat. No. 6,173,261, issued Jan. 9, 2001, which claims the benefit of U.S. Provisional Application No. 60/102,433, filed Sep. 30, 1998, the contents of which are incorporated herein by reference in their entirety. This application is also a continuation-in-part of U.S. patent application Ser. No. 08/943,944, filed Oct. 3, 1997, now U.S. Pat. No. 6,192,110, issued Feb. 20, 2001, which is a continuation-in-part of U.S. patent application Ser. No. 08/528,578, filed Sep. 15, 1995, now U.S. Pat. No. 5,675,707, issued Oct. 7, 1997.

BACKGROUND OF THE INVENTION

1. Field of the Invention

This invention relates to the automated acquisition of grammar fragments for recognizing and understanding spoken language.

2. Introduction

In speech-understanding systems, the language models for recognition and understanding are traditionally designed separately. Furthermore, while there is a large amount of literature on automatically learning language models for recognition, most understanding models are designed manually and involve a significant amount of expertise in development.

In general, a spoken language understanding task can have a very complex semantic representation. A useful example is a call-routing scenario, where the machine action transfers a caller to a person or machine that can address and solve problems based on the user's response to an open-ended prompt, such as "How may I help you?" These spoken language understanding tasks associated with call-routing are addressed in U.S. patent application Ser. No. 08/528,577, "Automated Phrase Generation", and U.S. Pat. No. 5,675,707 "Automated Call Routing System", both filed on Sep. 15, 1995, which are incorporated herein by reference in their entireties. Furthermore, such methods can be embedded within more complex task, as disclosed in U.S. patent application Ser. No. 08/943,944, filed Oct. 3, 1997, which is also hereby incorporated by reference in its entirety.

While there is a vast amount of literature on syntactic structure and parsing, much of that work involves a complete analysis of a sentence. It is well known that most natural language utterances cannot be completely analyzed by these methods due to lack of coverage. Thus, many approaches use grammar fragments in order to provide a localized analysis on portions of the utterance where possible, and to treat the remainder of the utterance as background. Typically, these grammar fragments are defined manually and involve a large amount of expertise.

In an attempt to solve some of these problems, U.S. patent application Ser. Nos. 08/960,289 and 08/960,291, both filed Oct. 29, 1997 and hereby incorporated by reference in their entireties, disclose how to advantageously and automatically acquire sequences or words, or "superwords", and exploit them for both recognition and understanding. This is advantageous because longer units (e.g., area codes) are both easier to recognize and have sharper semantics.

While superwords (or phrases) have been shown to be very useful, many acquired phrases are merely mild variations of each other (e.g., "charge this call to" and "bill this to"). For example, U.S. patent application Ser. No. 08/893,888, filed Jul. 8, 1997 and incorporated herein by reference in its entirety, discloses how to automatically cluster such phrases by combining phrases with similar wordings and semantic associations. These meaningful phrase clusters were then represented as grammar fragments via traditional finite state machines. This clustering of phrases is advantageous for two reasons: First, statistics of similar phrases can be pooled, thereby providing more robust estimation; and second, they provide robustness to non-salient recognition errors, such as "dialed a wrong number" versus "dialed the wrong number".

However, in order to utilize these grammar fragments in language models for both speech recognition and understanding, they must be both syntactically and semantically coherent. To achieve this goal, an enhanced clustering mechanism exploiting both syntactic and semantic associations of phrases is required.

SUMMARY

A method and apparatus for clustering phrases into grammar fragments is provided. The method and apparatus exploits succeeding words, preceding words and semantics associated to each utterance, in order to generate grammar fragments consisting of similar phrases. Distances between phrases may be calculated based on the distribution of preceding and succeeding words and call-types.

In at least one embodiment, the goal may be to generate a collection of grammar fragments each representing a set of syntactically and semantically similar phrases. First, phrases observed in the training set may be selected as candidate phrases. Each candidate phrase may have three associated probability distributions: of succeeding contexts, of preceding contexts, and of associated semantic actions. The similarity between candidate phrases may be measured by applying the Kullback-Leiber distance to these three probability distributions. Candidate phrases, which are close in all three distances, may then be clustered into a grammar fragment. Salient sequences of these fragments may then be automatically acquired, which are then exploited by a spoken language understanding module to determine a call classification.

BRIEF DESCRIPTION OF THE DRAWINGS

The preferred embodiments of this invention will be described in detail, with reference to the following figures, wherein:

FIG. 3A-3C are diagrams of fragment distance histograms;

FIG. 4 is a table of ranked grammar fragments with reference "charge it to";

FIG. 5 shows examples of grammar fragments;

FIGS. 6A and 6B are diagrams of grammar fragment generalization examples;

DETAILED DESCRIPTION

Figure 1:
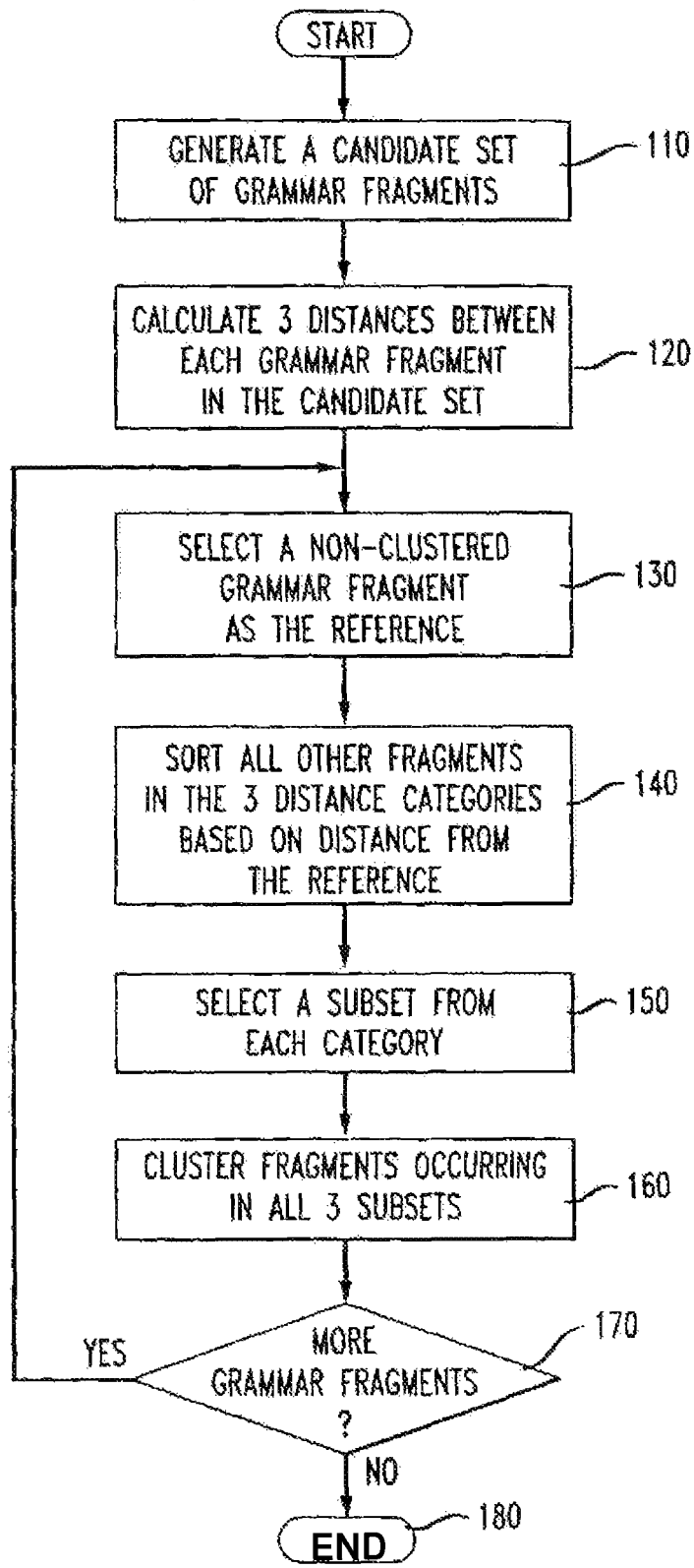
FIG. 1 is a flowchart for selecting and clustering grammar fragments.

FIG. 1 is a flowchart illustrating the process of selecting the clustering grammar fragments. At step 110, phrases, words or symbols observed in the training set are selected as candidate phrases and placed in a candidate set of grammar fragments. The process then proceeds to step 120, where three distance measurements are calculated between each grammar fragment and the other grammar fragments in the candidate set. The distance measurements are based on three associated probability distributions, including succeeding contexts, preceding contexts, and other associated semantic actions or call-types. The process then proceeds to step 130.

At step 130, a non-clustered grammar fragment is selected as the reference grammar fragment. Then, at step 140, all other fragments are sorted in the three separate distance categories, based on their distances from the reference fragment. The process then proceeds to step 150, where a subset is identified from each of the three ranked lists based on the maximum difference between two fragments on the list. The process then proceeds to step 160.

At step 160, any fragments that occur in all three subsets are clustered. The process then proceeds to step 170, where the process checks to see if any more grammar fragments need to be examined. If more grammar fragments need to be examined, the process returns to step 130; otherwise the process proceeds to step 180 and ends.

The process of FIG. 1 will not be further described with reference to FIGS. 2-10. The definition of some terms used in describing he figures are hereby described to clarify their use. A phrase is an arbitrary word sequence observed in the training transcriptions. All such phrases can be obtained by decomposing the transcriptions into n-tuple word sequences. Namely, each phrase is a substring of a sentence. The number of words in a phrase is constrained to be three or less in the experiments later described, although other embodiments are also practically possible.

A candidate phrase is a phrase having a higher frequency of occurrence than some arbitrary threshold. The candidate phrases are regarded as units for generating the grammar fragments. A grammar fragment is a cluster of phrases acquired based on their similarity and is represented as a conventional finite-state machine. These fragments are both symtactically and semantically coherent.

There are many standpoints for the linguistic terms syntax and semantics, so that the usage of these terms must be clarified. The syntactic association signifies the relationship between a grammar fragment and phrases succeeding or preceding the fragment. Several kinds of succeeding and preceding phrases for each fragment are generally observed in the training transcriptions. If the roles of fragments are similar to each other in spoken dialog, then the distribution of these phrases will be similar between the fragments. Thus, by syntactic association, we do not explicitly focus on grammatical issues, such as part-of-speech and tense, but rather on the distribution of phrases surrounding a grammar fragment. On the other hand, the semantic associations focus on the relationship between a fragment in spoken language and the semanticalations or call-type corresponding to the speech. The distribution of call-types for a fragment must be comparable to that for another fragment if the two fragments are to be clustered. The semantic association is therefore the cross-channel association between speech and call-types.

Figure 2:
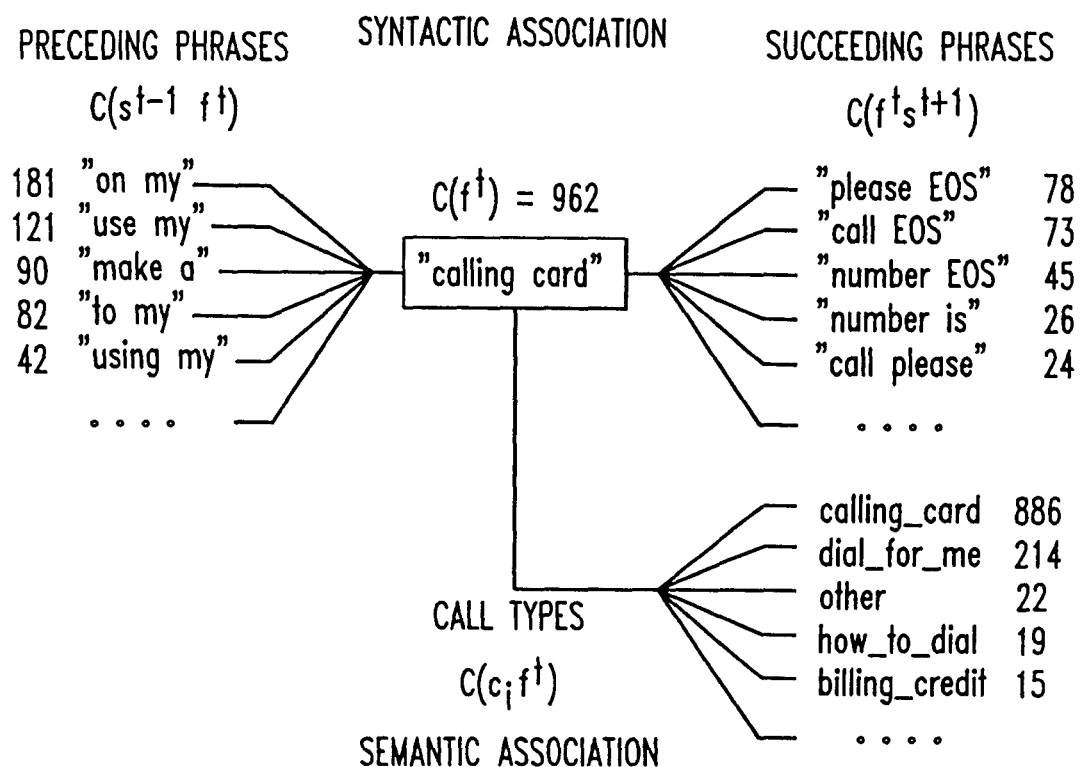
FIG. 2 is a diagram showing the syntactic and semantic association of a fragment.

An example of the syntactic and semantic associations of a fragment is illustrated in FIG. 2. The letter f denotes a grammar fragment, and the letters s and c define a preceding and succeeding phrase and call-type, respectively. In FIG. 2, f consists of only on phrase "call card". Suffixes, such as t and t+1, refer to a sequential order. Given a phrase, fragment, call-type or combination thereof as an argument, the function C( ) counts frequency of the argument in the training transcriptions. For instance, $C(f^t s^{t-1})$ denotes the frequency of the fragment f followed by a phrase s. BOS and EOS denote Beginning-Of-Sentence and End-Of-Sentence, respectively.

FIG. 2 shows that the fragment "calling card" was observed 962 times in the training transcriptions. The phrase "on my", for instance, preceded that fragment 181 times and "number is" succeeded it 26 times. The call-type calling card was associated with the fragment 886 times, which is a comparatively high frequency among the call-types. By counting the preceding and succeeding phrases, two syntactic probability distributions for each fragment are obtained. The call-type probability distribution for each fragment is also obtained by counting call-types assigned to transcriptions in which the fragment is observed. This call-type probability distribution represents a semantic feature vector for a fragment.

In order to generate syntactic probability distributions, a set of phrases which precedes or succeeds fragments is generated first. In the following discussion, a phrase that succeeds or precedes a fragment is called its context. Though in our experiments the context consists of single words, our algorithm can be applied to the longer context so we describe the method in the general case. Consequently the context can contain words and non-terminal symbols corresponding to grammar fragments.

Since the contexts are the predecessor or successor of a fragment, they consist of not only words but also the symbols BOS and EOS. In other words, a phrase in a grammar fragment cannot contain these symbols because it must have both preceding and succeeding contexts.

Three probability distributions for each grammar fragment are obtained by using preceding and succeeding context frequencies, and call-type frequency. The estimated probability distributions focusing on succeeding and preceding contexts of a fragment fj are denoted in equations (1) and (2), respectively.

$$p(s_i^{t+1} \mid f_j^t) = \frac{C(f_j^t s_i^{t+1})}{C(f_j)} \quad (1)$$

$$= \frac{C(f_j^t w_1^{t+1} w_2^{t+2} \ldots w_{N_c}^{t+N_c})}{C(f_j)}$$

$$p(s_i^{t-1} \mid f_j^t) = \frac{C(s_i^{t-1} f_j^t)}{C(f_j)} \quad (2)$$

$$= \frac{C(w_1^{t-N_c} \ldots w_{N_c-1}^{t-2} w_{N_c}^{t-1c} f_j^t)}{C(f_j)}$$

In both equations (1) and (2), $s_i$ denotes the i-th context of the fragment fj, frequency list S, $f_j$ is the j-th grammar fragment in the fragment grammar; $w_N$, denotes the N-th word in the context $s_1$; and $N_c (N_c \geq 1)$ is the number of items in the context $s_i$. Suffixes, such as t, t+1, and t−1, denote the sequential order of words, contexts, or fragments. The function C( ) counts the frequency of a sequence in the training transcriptions, as described above.

The contexts $s_1^{t+1}$ and $s_1^{t-1}$ are equivalent to word sequences $w_1^{t+1} w_2^{t+2} \ldots w_{N_c}^{t+N_c}$ and $w_1^{t-N_c} \ldots w_{N_c-1}^{t-2} w_{N_c}^{t-1}$, respectively. Because these equations refer to not words but context, the larger the parameter $N_c$ is set, the more the variety in context can be theoretically observed. In practice, however, these probability distributions become sparse when the parameter $N_c$ is large. Therefore, the parameter $N_c$ generally should be determined based on the size of the training transcriptions. These two probability distributions represent syntactic feature vectors of the grammar fragments. On the other hand, the probability distribution focusing on semantic associations can be obtained from the call-type frequencies. Equation (3) shows how to estimate probability distribution based on call-type frequencies. The letter $c_i$ denotes one of the call-types in this task and $C(c_i, f_j)$ is the frequency of the call-type $c_i$ associated with the phrase $f_j$.

$$p(c_i \mid f_j) = \frac{C(c_i f_j)}{C(f_j)} \quad (3)$$

As a result, three types of probability distribution are obtained for each fragment. The distance between the two fragments is calculated by comparing each type of probability distribution. Namely, three distances between two fragments are measured by using succeeding context, preceding context, and call-type probability distributions.

While any distance measurements known to those skilled in the ar may e used, the Kullback-Leibler distance is one of the most popular distance measurements for measuring similarity between two probability distributions. Because of the logarithmic term in the Kullback-Leibler distance, the probabilities in equations (1) and (2) and (3) must be positive. Therefore, back-off smoothing is applied in advance to each probability distribution by using unigram probability distribution. The context frequency list S described above and the set of call-type frequencies are utilized to make the context and the call-type unigram probability distributions, respectively. Equation (4) shows the definitions of the Kullback-Leibler distance between fragments $f_1$ and $f_2$ exploiting the succeeding context probability distributions. The substitute in $d_S$ denotes "succeeding context."

$$d_s(f_1 f_2) = \sum_{\forall s_i \in S} \hat{p}(s_i^{t+1} \mid f_1^t) \cdot \log \frac{\hat{p}(s_i^{t+1} \mid f_1^t)}{\hat{p}(s_i^{t+1} \mid f_2^t)} \quad (4)$$

S represents the set f of contexts described above. The term $s_i$ is one off the contexts. The conditional probabilities $\hat{p}(s_i^{t+1} \mid f_1^t)$ and $\hat{p}(s_i^{t+1} \mid f_2^t)$ are the smoothed distributions for the fragments $f_1$ and $f_2$, respectively. A distance based on the preceding context probability distributions can also be measured in the same manner. Equation (5) defines the distance based on preceding context probability distributions.

$$d_p(f_1 f_2) = \sum_{\forall s_i \in S} \hat{p}(s_i^{t-1} \mid f_1^t) \cdot \log \frac{\hat{p}(s_i^{t-1} \mid f_1^t)}{\hat{p}(s_i^{t-1} \mid f_2^t)} \quad (5)$$

The functions $\hat{p}(s_i^{t-1} \mid f_1^t)$ and $\hat{p}(s_i^{t-1} \mid f_2^t)$ are smoothed predecessor probability distributions for the fragments $f_1$ and $f_2$, respectively. Equation (6) defines the distance based on call-type probability distributions. In equation (6), $c_i$ represents one of the call-types belonging to the call-type set C. The functions $\hat{p}(c_i \mid f_1)$ and $\hat{p}(c_i \mid f_2)$ are smoothed probability distributions for the call-type $c_i$ associated with fragments $f_1$ and $f_2$, respectively.

$$d_c(f_1 f_2) = \sum_{\forall c_i \in S} \hat{p}(c_i \mid f_1) \cdot \log \frac{\hat{p}(c_i \mid f_1)}{\hat{p}(c_i \mid f_2)} \quad (6)$$

In general, the Kullback-Leibler distance is an asymmetric measure. Namely, the distance from $f_1$ and $f_2$ is not equal to that from $f_2$ and $f_1$. We therefore symmetrize the Kullback-Leibler distance by defining each type of distance as the average two distances measured from both fragments. Thus the fragment distances shown in equations (7), (8) and (9) are used in fragment clustering.

$$D_s(f_1 f_2) = \frac{d_s(f_1 f_2) + d_s(f_2 f_1)}{2} \quad (1)$$

$$D_p(f_1 f_2) = \frac{d_p(f_1 f_2) + d_p(f_2 f_1)}{2} \quad (2)$$

$$D_c(f_1 f_2) = \frac{d_c(f_1 f_2) + d_c(f_2 f_1)}{2} \quad (3)$$

Figure 3A:
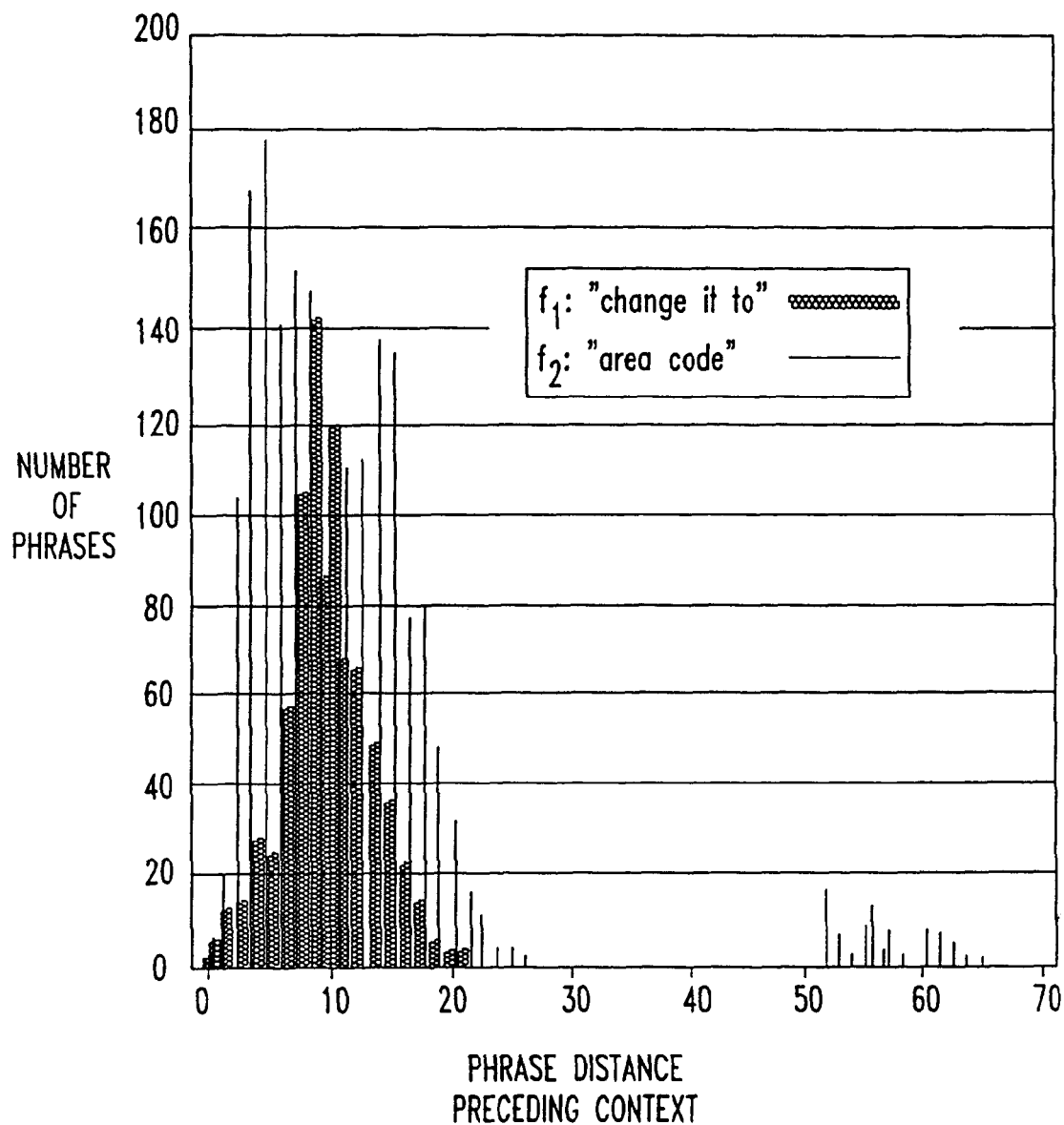
Figure 3C:
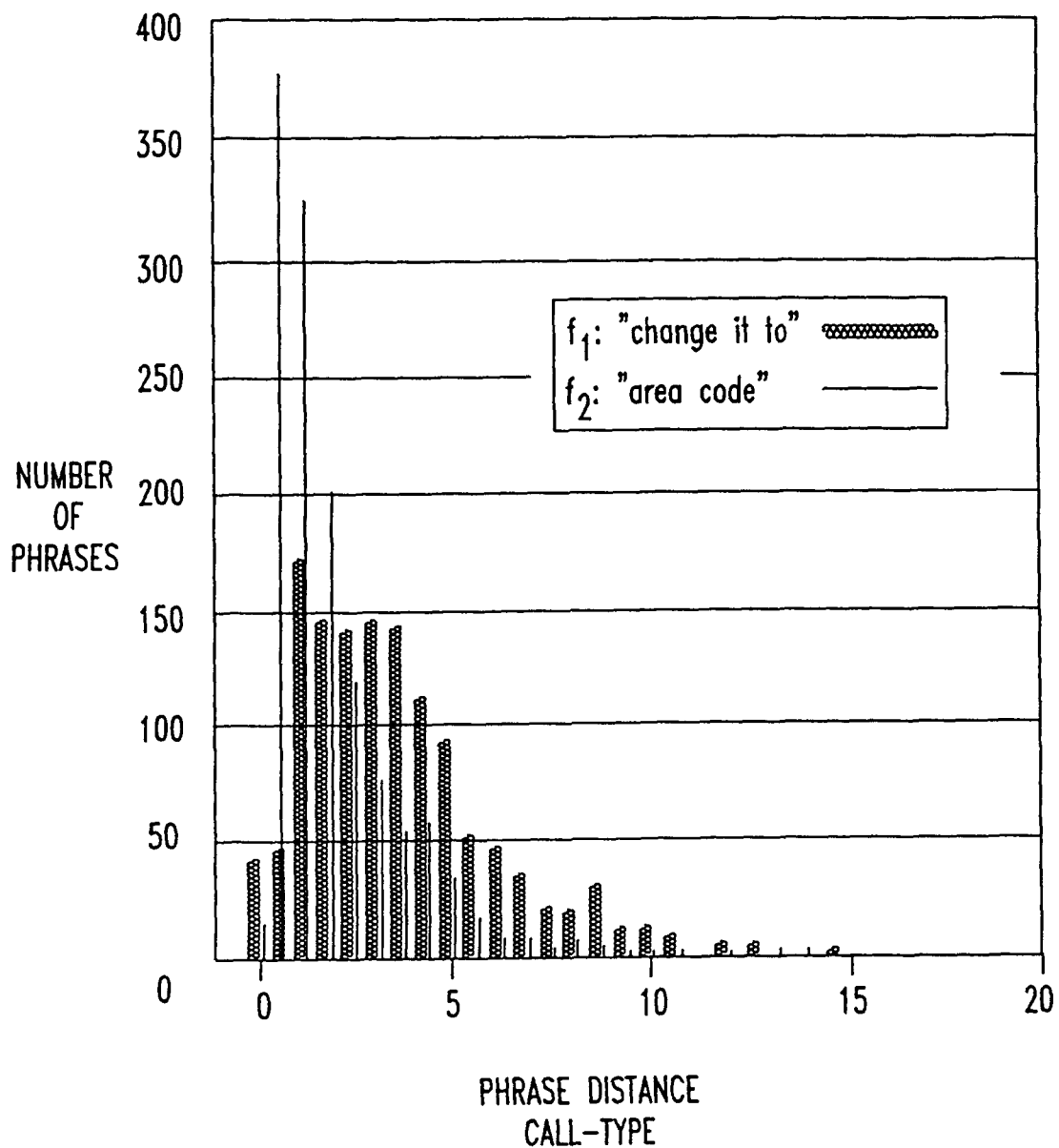

FIGS. 3A-3C are histograms of these three types of fragment distance. Two reference fragments $f_1$ and $f_2$ are selected to illustrate the difference in histograms. In this example, each fragment contains only one phrase. One of the phrases is "charge it to" and the other phrase is "area code". Three distances from each reference fragment are measured to create the histograms. Both histograms for the preceding and succeeding contexts have similar distributions which show a large peak within the range from approximately 5.0 to 15.0. Smaller amounts of distributions are also observed in both histograms. The peak for the phrase "area code" shifts to the left compared to that for the phrase "charge it to" in both histograms. In the histogram based on call-type distributions, the histogram for the phrase "area code" is skewed compared to that for another phrase. Thus, the histograms illustrate why the preceding and succeeding syntactic distributions cannot be directly combined with the call-type semantic distributions. This problem is further addressed below.

The basic idea for grammar fragment clustering is that the fragments having a comparatively small distance from a reference fragment are regarded as being similar and are clustered into the same grammar fragment. In this study, however, three distances based on preceding contexts, on succeeding contexts and on call-types are obtained between fragments. Therefore, the fragments between which all distances are small are clustered together.

All candidate phrases described above may be generated from the training transcriptions. Then each candidate phrase forms a grammar fragment as the initial set of grammar fragment. Namely each grammar fragment consists of one candidate phrase at the first stage. The following procedure in the fragment clustering algorithm is described as follows.

The frequency of each grammar fragment may be obtained by summing candidate phrase frequencies. A grammar fragment $f_0$ having the highest frequency and consisting of one phrase is selected as the reference fragment. All fragments are sorted in the order of fragment distances measured from $f_0$. The fragment distance lists based on preceding contexts, on succeeding contexts, and on call-types are sorted independently. Thus, three fragment lists in distance order are obtained as the result of the sorting. In each fragment list, the subset of fragment for clustering is determined based on the maximum difference in distance between successive fragments in that list. For instance, the fragment list based on the distance on succeeding contexts, the number of candidate fragment $N_s(f_0)$ is determined by:

$$N_s(f_0) = \operatorname*{argmax}_{1 \leq i \leq N_m} \{D_s(f_0 f_{i+1}) - D_s(f_0 f_i)\} \quad (10)$$

Symbols $f_i$ and $f_{i+1}$ represent rank ordered fragments with respect to the distance on succeeding contexts. $D_s(f_0 f_{i+1})$ and $D_s(f_0 f_i)$ are the distance from the reference fragment $f_0$ to the fragment $f_{i+1}$ and $f_i$, respectively. The distance $D_s(f_0 f_i)$ monotonically increases with i. $N_m$ is the maximum number of fragments to be compared. The number of candidate fragments based on the distance focusing on preceding contexts $N_p(f_0)$ and call-types $N_c(f_0)$ can be also determined by using distances $D_p(f_0 f_i)$ and $D_c(f_0 f_i)$. Following these determinations, the maximum number of candidates among three types of distance is determined by:

$$N(f_O) = \max\{N_p(f_O), N(f_O), N_c(f_O)\} \quad (11)$$

All fragments whose rank order in each fragment list is less than $N(f_0)$ are selected as candidates of similar fragments. Fragments listed within the making $N(f_0)$ among all three types of candidate list are syntactically and semantically similar to the reference fragment $f_0$. Such fragments are merged into the reference fragment $f_0$. Equation (12) shows the criterion of fragment classification based on fragment distance orders.

$$f'_O = \{f_i | O_p(f_i) \leq N(f_O) \& O_s(f_i) \leq N(f_O) \& O_c(f_i) \leq N(f_O)\} \quad (12)$$

Symbol $f_0$ denotes the new grammar fragment generated by this merging. $O_p(f_i)$, $O_s(f_i)$, and $O_c(f_i)$ represent the ranked order focusing on preceding and succeeding contexts, and call-types, respectfully. If there is a fragment similar to the reference fragment, the reference fragment $f_0$ is updated by clustering the similar fragments. The clustering algorithm is iterated over the updated fragment set. If the grammar fragment $f_0$ is not augmented, $f_0$ is referred as one of the candidates when another fragment is selected as the reference in this iteration.

FIG. 4 shows an example of fragment clustering. In this example, the reference fragment is "charge it to" and all distances were measured from this reference. Two fragments "bill it to" and "charge to" were merged into the reference fragment. Based on equation (10), focusing on the preceding context, for example, the maximum difference in the distance determined by the number of candidate fragments is 0.52. ($N_s$=argmax (3.04−2.52)=0.52). Therefore, the maximum difference occurred at $N_p$("charge it to")=18. Furthermore, based on the calculations of equation (10) for each distance list, the maximum number of candidates among three types of distance N("charge it to") is 26 based on the equation (11). The reference fragment "charge it to" and two other fragments "bill it to" and "charge to", which were listed within the ranking N("charge it to")=26, were merged into the reference fragment to form the fragment grammar.

FIG. 5 shows an example of the grammar fragments generated through the algorithm with the following parameter values. The number of words in a phrase was constrained to be up to three. Each phrase observed 30 times or more in the training transcription was selected as a candidate to participate in the clustering. The maximum number of candidate fragments $N_m$=80. The fragment clustering algorithm yielded a total of 288 phrases in 111 grammar fragments. The average number of phrases in a grammar fragment was 2.59 (i.e., 288/111). A grammar fragment named <000> contains the maximum number of phrases (9). This fragment demonstrates that several kinds of greeting phrases, which are generally observed in spontaneous speech dialogs, were clustering by our algorithm.

Some phrases in the fragment can be partially replaced into another grammar fragment. By using the fragment having higher fragment frequency than that of a fragment focused, the fragment is parsed and some words in the fragment can be replaced into non-terminal symbols representing another fragment. For example, the phrase "want to make" in the fragment <015> can be decomposed into "want", "to" and "make". The words "want" and "make" are one of the phrases in the fragments <005> and <002>, respectively. Therefore, the phrase "want to make" is an instantiation of the fragment "<005> to <002>". As a consequence of this parsing, the fragment grammar acquires the ability to represent not only phrases given as input, but also words sequences not observed in the training transcriptions. FIGS. 6A and 6B illustrate an example of the grammar fragment generalization by parsing fragments. In this example, the phrases in the fragment <015> are generalized using the fragments <002> and <005>. Three phrases in the fragment <015> can be represented as "<005> to <002>" and "like to <002>". These non-terminal symbols in the fragment <015> are expanded into phrases such as "need to place" and "would like to place". As a consequence of this generalization, the fragment <015> has acquired an additional seven phrases, such as "want to place", "would like to make" and "have to place".

The generalization of grammar fragments is performed in order of the grammar fragment frequency. A parser replaces the word sequence of each phrase into a non-terminal symbol that represents the grammar fragment in which the phrase belongs. When a set of grammar fragments has been created, the frequency of each fragment is obtained by summing the frequencies of the phrases represented by that fragment.

Figure 7A:
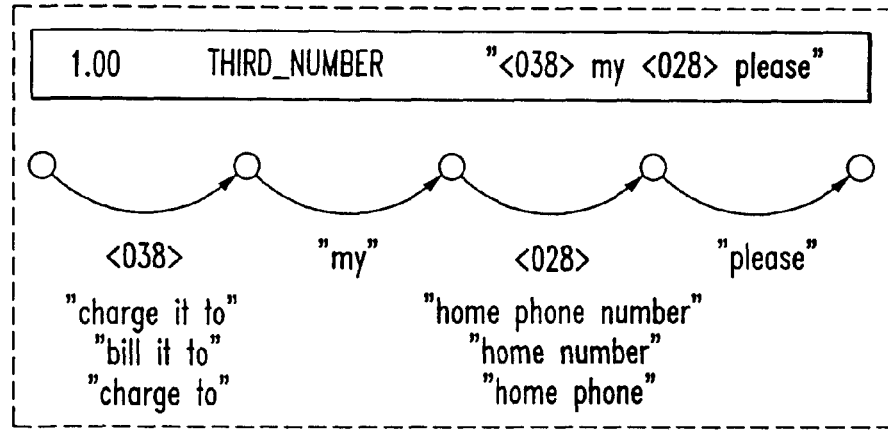
FIGS. 7A-7C are diagrams of salient grammar fragment examples.
Figure 7B:
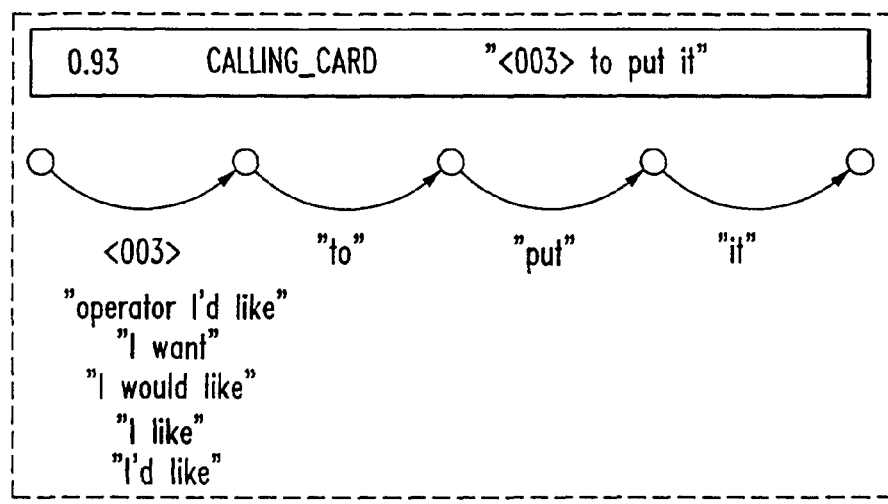
Figure 7C:
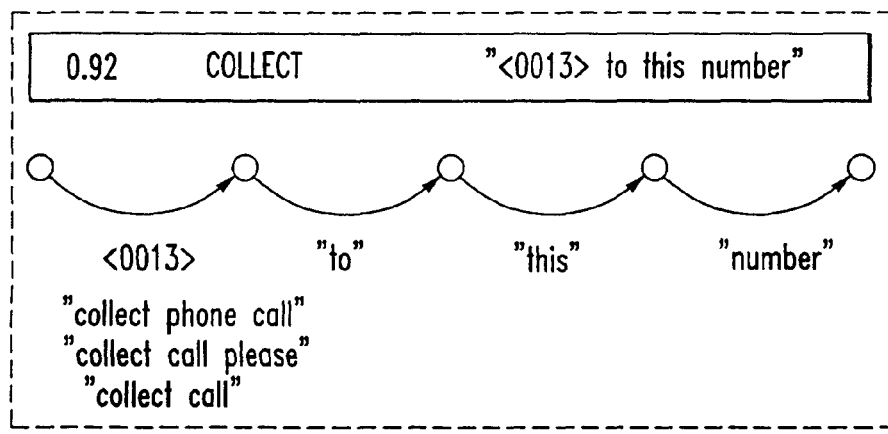

For call-type classification, salient grammar fragments are automatically generated from the parsed training transcriptions and associated call-types. Each salient grammar fragment consists of call-type of the highest association score and a corresponding sequence that consists of conventional words and non-terminal symbols for grammar fragments. FIGS. 7A-7C show examples of the salient grammar fragment that represent several kinds of word sequences having both syntactic and semantic similarity.

Figure 8:
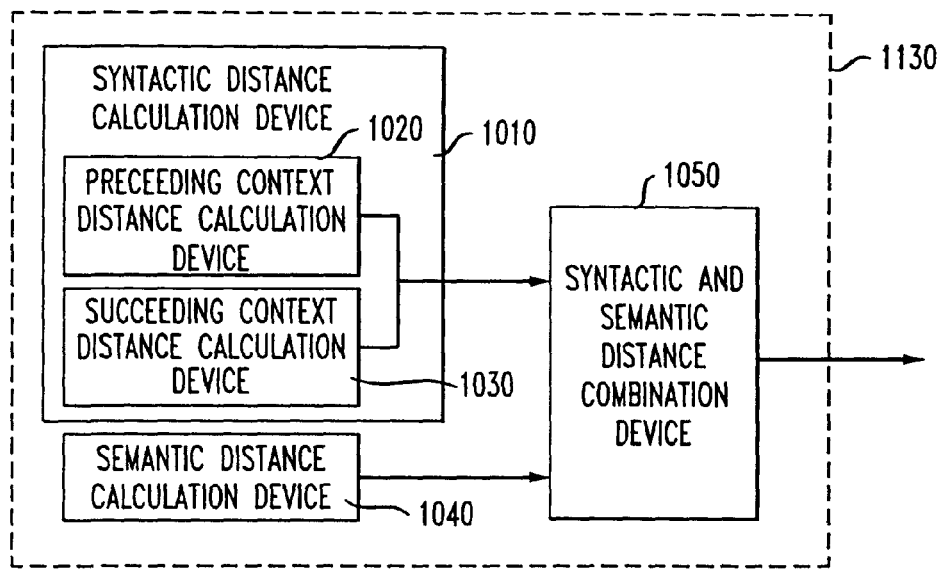
FIG. 8 is an exemplary arrangement of a distance calculation device.

FIG. 8 shows an exemplary distance calculation device 1130 for combining syntactic and semantic distances using the methods discussed above. The syntactic distance device 1010 includes the preceding context distance calculation device 1020 and the succeeding context distance calculation device 1030. As shown in the histograms in FIGS. 3A and 3B, since the preceding and succeeding context distances are similarly distributed, they may be easily combined into one output. However, as shown in the histogram in FIG. 3C, the semantic distribution representing call-types is skewed so that it cannot be directly combined. Therefore, a separate semantic distance calculation device 1040 calculates the semantic distances.

Using the method discussed in reference to FIGS. 4-7, the syntactic and semantic distance combination device 1050 combines the syntactic and semantic distances so that phrase may be properly clustered. Although the syntactic distance calculation device 1010, the preceding context distance calculation device 1020, the succeeding context distance calculation device 1030, the semantic distance calculation device 1040, and the syntactic and semantic distance combination device 1050 have been shown as separate devices, these devices may be incorporated into a single device, for example. The computing device or devices each include a processor that performs the steps disclosed herein.

Figure 9:
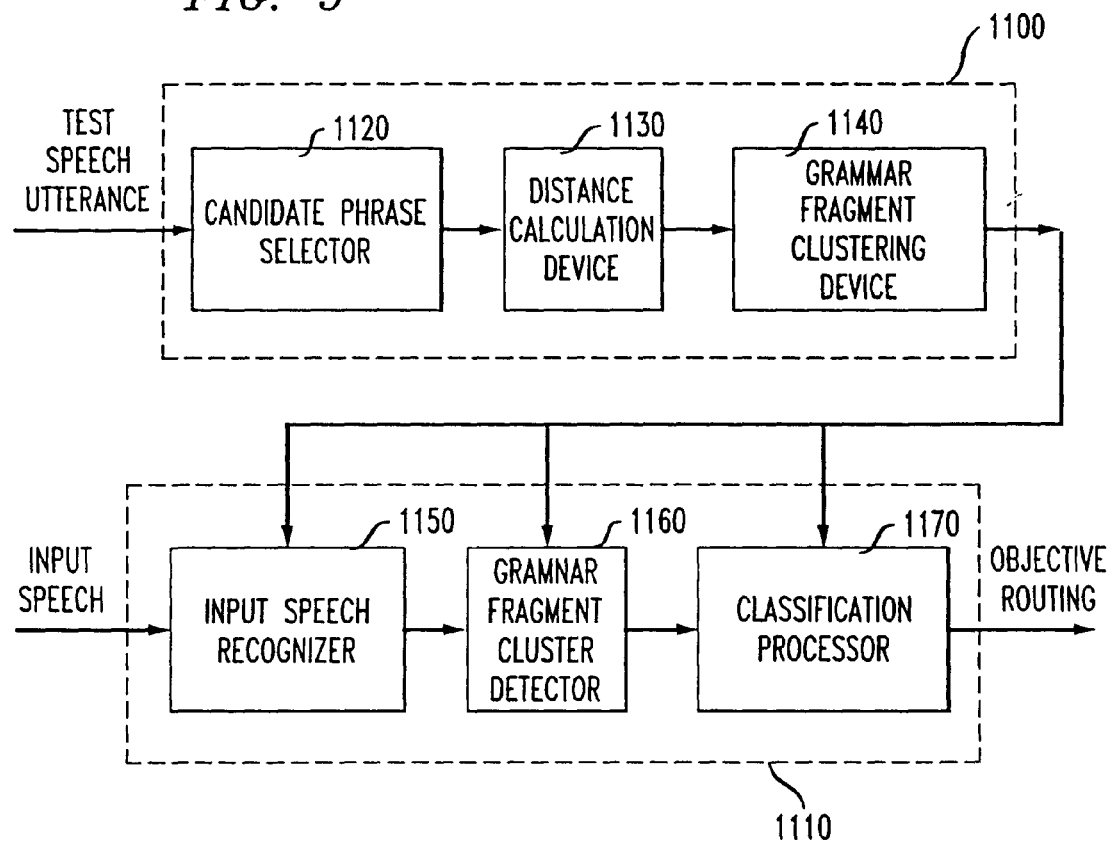
FIG. 9 is an exemplary speech recognition and understanding system in which the invention may be implemented.

FIG. 9 shows a structure in which the resulting syntactic and semantic clustering of grammar fragments may be implemented. As can be seen from the drawing, the structure comprises two related subsystems: the grammar fragment clustering generation subsystem 1100 and input speech classification subsystem 1110.

The grammar fragment clustering subsystem 1100 operates on a database of a large number of utterances each of which is related to one of the predetermined set of routing objectives, where each such utterance is labeled with its associated routing objective. The operation of this subsystem is essentially carried out by the candidate phrase selector 1120 which selects as an output a set of candidate phrases having a probabilistic relationship with one or more of the set of predetermined routing objectives with which the input speech utterances are associated. The selected candidate phrases are then input to a distance calculation device 1130 which determines the probabilistic distances between candidate phrases. Once the distances are calculated and ranked, the grammar fragment clustering device 1140 clusters those phrases which appear in a subset of all three distance rankings. The operation of the candidate phrase selector 1120, distance calculation device 1130, and the grammar fragment clustering device 1140 are generally determined in accordance with the previously described method for selecting and clustering grammar fragments. Operations of the input speech classification subsystem 1110 begins with inputting of a user's task objective request, in the caller's natural speech, to input speech recognizer 1150. The input speech recognizer 1150 may be of any known design and performs the functions of recognizing, or spotting, the existence of one or more grammar fragments in the input speech. The grammar fragment cluster detector 1160 then detects the grammar fragment clusters present among the grammar fragments recognized. As can be seen in the figure, the grammar fragment clusters developed by the grammar fragment clustering subsystem 1100 are provided as an input to the input speech recognizer 1150, the grammar fragment cluster detector 1160 and the classification processor 1170.

The output of the grammar fragment cluster detector 1160, which will comprise the detected grammar fragment clusters appearing in the caller's routing objective request, is provided to classification processor 1170. The classification processor 1170 may apply a confidence function, based on the probabilistic relation between the recognized grammar fragment clusters and selected task objectives, and make a decision either to implement a particular task objective or after determining that no decision is likely, to default the user to an operator position.

Experiments were conducted using the method described above. In such a task, digit sequences, such as telephone numbers and credit card numbers, are observed in the training transcription. These digit sequences can be generalized by using non-terminal symbols for them. Some non-terminal symbols such as <digit07> and <digit10> are used to generalize telephone numbers and others such as <digit16> and <digit18> are applied to credit card numbers. In this experiment, the training transcriptions were first filtered by using such non-terminal symbols. By using this filtered training transcriptions, the phrases, contexts and grammar fragments were generated by the method described above.

The engine used for speech recognition was the AT&T Watson recognizer. The recognition language model is as described in U.S. patent application Ser. Nos. 08/960,289 and 08/960,291. The acoustic model for the process was trained with a database of telephone-quality fluent speech. The training transcription contained 7,844 sentences while the test transcription contained 1,000 sentences. For the grammar fragment acquisition, the number of words in a phrase was constrained to be three or less in this experiment. Each phrase observed 30 times or more in the training transcription was selected as a candidate to participate in the clustering. Totally 1108 candidate phrases were obtained. The context length $N_c$ for computing the distances between two fragments was set to one. 3582 context phrases were used for creating the syntactic probability distributions. The maximum number of candidate fragment $N_m$ was 80.

Figure 10:
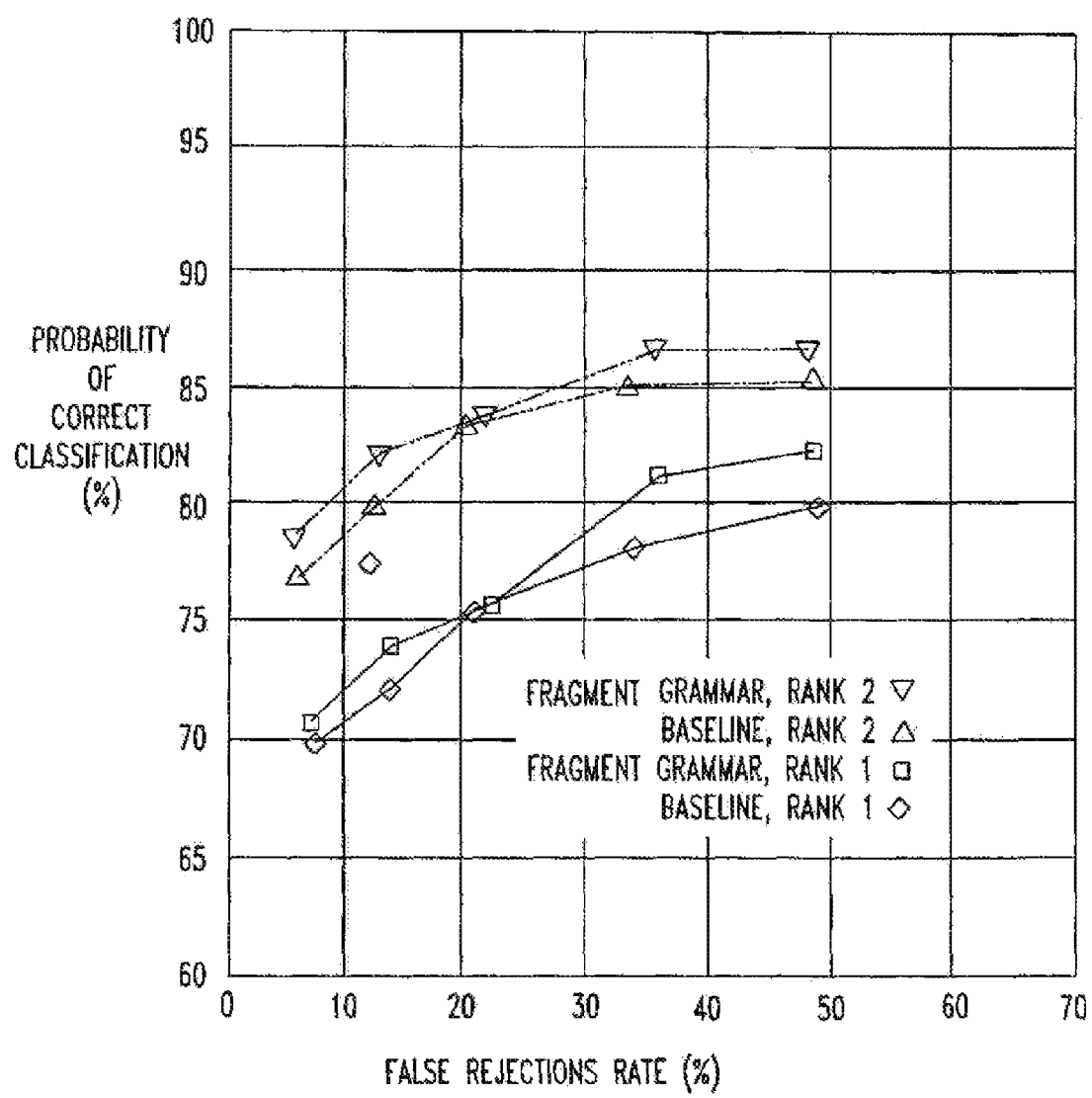
FIG. 10 is a chart showing the false rejection rate with and without fragment grammar.

In the call-type classification, there are two important performance measures. The first measure is the false rejection rate, where a call is falsely rejected or classified as the call-type other. Since such calls are transferred to a human operator, this measure corresponds to a missed opportunity for automation. The second measure is the probability of correct classification. Errors in this measure lead to misunderstanding that must be resolved by a dialog manager. FIG. 10 illustrates the probability of correct classification versus the false rejection rate. As a baseline for comparison, the performance without the fragment grammar is also shown. The curves are generated by varying a salience threshold.

The call-type classification performance is significantly improved by the fragment grammar. This improvement results from the salient grammar fragments used in the call-type classifier that now accept various phrases that are syntactically and semantically similar to the originals providing generality. From this experimental result, we can conclude that by generalizing grammar fragments, unobserved phrases are obtained without deteriorating the call-type classification performance.

Figure 11A:
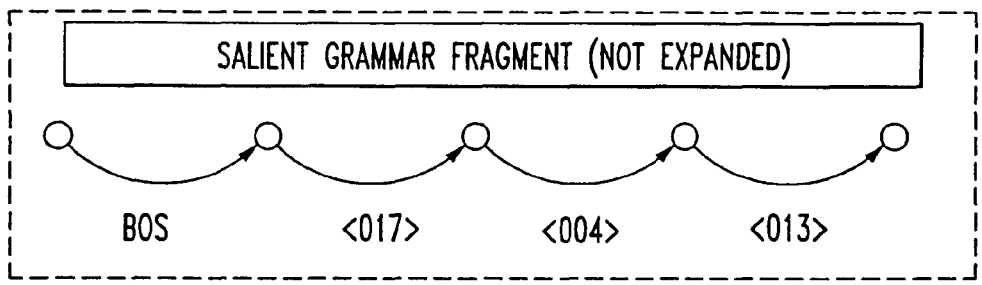
FIGS. 11A-11C are exemplary diagrams of phrases accepted by a salient grammar fragment.
Figure 11B:
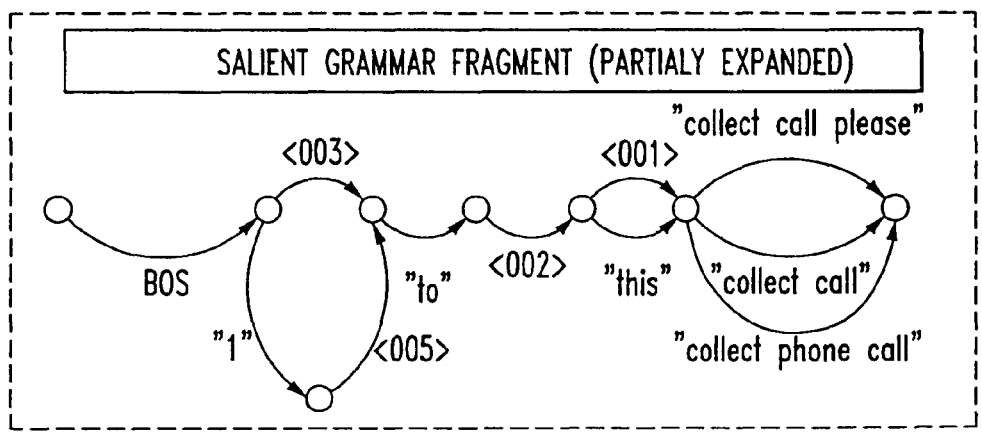
Figure 11C:
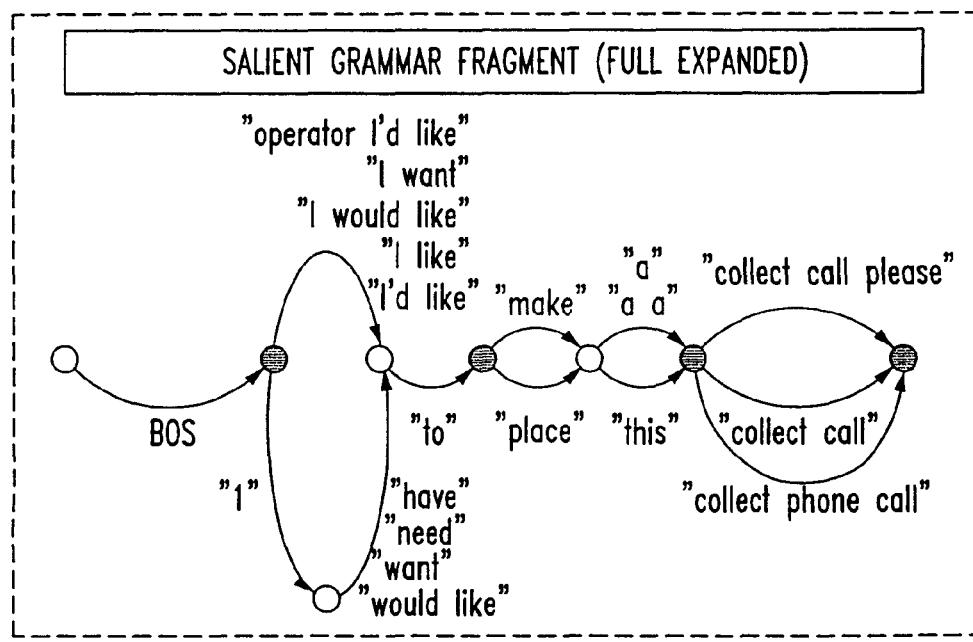

An example of the variety of phrases accepted by a salient grammar fragment is illustrated in FIG. 11*a*-11*c*. The fragment "BOS<017><004><013>" has an association with the call-type "COLLECT" with 0.97 of the association score. The fragment classes "<017>", "<004>" and "<013>" used in this salient grammar fragment can be expanded into phrases and other fragment grammars. A grammar fragment "<017>", for example, is expanded into two paths, "<003>" or "I<005>". As a consequence of this expansion, a fully expanded salient fragment network is obtained as shown in FIG. 11C. This phrase network accepts 126 types of phrases. It is important to note that some phrases represented by this salient grammar fragment such as "BOS I like to make a collect phone call" are not observed in the training transcriptions. In fact, a total of 246 unseen salient phrases have been discovered by clustering and generalizing the fragment grammar.

While this invention has been described in conjunction with the specific embodiments outlined above, it is evident that any alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

We claim:

1. A method comprising:
    selecting candidate multi-word phrases from a set of words, wherein a maximum number of candidate multi-word phrases is based on a highest of a number of preceding contexts;
    for each candidate multi-word phrase in the candidate multi-word phrases, generating a measurement associated with a succeeding context of a succeeding phrase and a preceding context of a preceding phrase using a similarity in the candidate multi-word phrases;
    clustering, via a processor, the candidate multi-word phrases into a grammar fragment based on the measurement, wherein the grammar fragment represents similar phrases that are both syntactically and semantically coherent; and
    recognizing input speech using the grammar fragment.

2. The method of claim 1, wherein the similarity is one of a semantic similarity and a syntactic similarity.

3. The method of claim 1, wherein each candidate phrase has both semantic associations and syntactic associations.

4. The method of claim 3, wherein the syntactic associations are syntactic probabilistic distributions of the succeeding context and syntactic probabilistic distributions of the preceding context.

5. The method of claim 4, wherein the semantic associations are semantic probabilistic distributions.

6. The method of claim 5, wherein the semantic similarity and syntactic similarity are measured by applying distance measurements between the syntactic probabilistic distributions of the succeeding context, the syntactic probabilistic distributions of the preceding context, and the semantic probabilistic distributions.

7. The method of claim 6, wherein the semantic probability distributions are combined with the syntactic probabilistic distributions of the succeeding context and the syntactic probabilistic distributions of the preceding context.

8. The method of claim 7, wherein the method is recursive.

9. The method of claim 6, wherein the semantic measurements and the syntactic measurements are calculated using Kullback-Leibler distance measurements.

10. A system comprising:
    a processor; and
    a computer-readable storage medium having instruction stored which, when executed by the processor, cause the processor to perform operations comprising:
        selecting candidate multi-word phrases from a set of words, wherein a maximum number of candidate multi-word phrases is based on a highest of a number of preceding contexts;
        for each candidate multi-word phrase in the candidate multi-word phrases, generating a measurement associated with a succeeding context of a succeeding phrase and a preceding context of a preceding phrase using a similarity in the candidate multi-word phrases;
        clustering, via a processor, the candidate multi-word phrases into a grammar fragment based on the measurement, wherein the grammar fragment represents similar phrases that are both syntactically and semantically coherent; and
        recognizing input speech using the grammar fragment.

11. The system of claim 10, wherein the similarity is one of a semantic similarity and a syntactic similarity.

12. The system of claim 10, wherein each candidate phrase has both semantic associations and syntactic associations.

13. The system of claim 12, wherein the syntactic associations are syntactic probabilistic distributions of the succeeding context and syntactic probabilistic distributions of the preceding context.

14. The system of claim 13, wherein the semantic associations are semantic probabilistic distributions.

15. The system of claim 14, wherein the semantic similarity and syntactic similarity are measured by applying distance measurements between the syntactic probabilistic distributions of the succeeding context, the syntactic probabilistic distributions of the preceding context, and the semantic probabilistic distributions.

16. The system of claim 15, wherein the semantic probability distributions are combined with the syntactic probabilistic distributions of the succeeding context and the syntactic probabilistic distributions of the preceding context.

17. The system of claim 16, wherein the method is recursive.

18. The system of claim 15, wherein the semantic measurements and the syntactic measurements are calculated using Kullback-Leibler distance measurements.

19. A computer-readable storage device having instructions stored which, when executed by a computing device, causes the computing device to perform operations comprising:
    selecting candidate multi-word phrases from a set of words, wherein a maximum number of candidate multi-word phrases is based on a highest of a number of preceding contexts;
    for each candidate multi-word phrase in the candidate multi-word phrases, generating a measurement associated with a succeeding context of a succeeding phrase and a preceding context of a preceding phrase using a similarity in the candidate multi-word phrases;
    clustering, via a processor, the candidate multi-word phrases into a grammar fragment based on the measurement, wherein the grammar fragment represents similar phrases that are both syntactically and semantically coherent; and
    recognizing input speech using the grammar fragment.

20. The computer-readable storage device of claim 19, wherein the similarity is one of a semantic similarity and a syntactic similarity.

* * * * *